US012447510B2

(12) United States Patent
Austin

(10) Patent No.: US 12,447,510 B2
(45) Date of Patent: Oct. 21, 2025

(54) STINGRAY SYSTEM

(71) Applicant: Cody Austin, Carlin, NV (US)

(72) Inventor: Cody Austin, Carlin, NV (US)

( * ) Notice: Subject to any disclaimer, the term of this patent is extended or adjusted under 35 U.S.C. 154(b) by 259 days.

(21) Appl. No.: 18/225,521

(22) Filed: Jul. 24, 2023

(65) Prior Publication Data

US 2025/0033094 A1 Jan. 30, 2025

(51) Int. Cl.
*B08B 3/02* (2006.01)
*B08B 3/08* (2006.01)

(52) U.S. Cl.
CPC ................ *B08B 3/024* (2013.01); *B08B 3/08* (2013.01)

(58) Field of Classification Search
None
See application file for complete search history.

(56) References Cited

U.S. PATENT DOCUMENTS 10,199,806 B2 * 2/2019 Ewert ..................... B24C 1/003
10,873,291 B1 * 12/2020 Parker ..................... F24S 40/20
11,235,890 B1 * 2/2022 Dahlstrom ............ B05B 13/005

OTHER PUBLICATIONS

Waterjet Cutting History: Origins and Timeline (https://www.techniwaterjet.com/waterjet-cutting-history/ (Year: 2025).*
IDS Blast (https://idsblast.com/t090-5/?srsltid=AfmBOorx5S5seroOqN57dpDYb91FyFsCoQ2PNtXpCNixY6QVT2mAXTHrWzs&gQT=1 (Year: 2025).*

* cited by examiner

*Primary Examiner* — Rita P Adhlakha
(74) *Attorney, Agent, or Firm* — Foundation Patents Law Firm; Richard Bennett Salles

(57) ABSTRACT

An industrial long reach high pressure water blaster capable of 15,000 psi water pressure and 140 Gallons per minute. RF system-controlled robotic hydraulics move the stinger (the robotic pinpoint spray lance wand, trigger and water nozzle) toward a debris site at the proper spray angle (substantially more accurate than a one-vector track like a handheld power washer). Two slew drives and associated hydraulic lines braced to a boom/robotic-arm via equidistant metallic brackets allow the stinger system to remotely reach most any debris site without undue vibration. The stinger system is therein capable of 360° pitch, roll and yaw movement to bring the high-pressure water to any location, even concealed debris.

3 Claims, 19 Drawing Sheets

STINGRAY SYSTEM

CLAIM OF PRIORITY

This application currently claims priority to no prior U.S. patent applications.

TECHNICAL FIELD

This disclosure relates to the technical fields of hydro-blasting and robotics.

BACKGROUND

Hydro-blasting/hydro-jet cleaning is an effective form of power washing, used to remove buildup and debris (scale) in tanks, agitators, cladding, etc. The hydro-blasters customarily use high pressure nozzle at the tip of a spray gun.

While the technology to shoot water as high as 30,000 PSI has existed for some time, no pressure washing system has heretofore solved the problem of getting the high-pressure water to a desired location in pinpoint fashion, especially when the scale is located on the inside (hydraulic power unit HP) of a tall tank. Customarily, makeshift scaffolding systems are built to physically carry or wheel a hydro-blaster to a debris site. Cleaners are often forced to use a I" hose tank tied with a rope, or temporarily rig a blaster to a crane, all of which must be continually moved and maintained by hand. Troublesome vibration then occurs, forcing replacement of valves and diaphragms. Furthermore, the process is ordinarily arduous and dangerous.

What is needed (and solved by the instant disclosure) is a radio-controlled robotic hydro-blaster using hydraulic power to bring the water nozzle to the debris.

SUMMARY

Disclosed are a methodology and apparatus device for on-point robotically-controlled hydro-blasting at previously unreachable heights. Inter alia, the invention is an industrial, long reach, robotic 360° swivel/rotating pressure water blaster capable of 15,000 PSI water pressure and 140 gallons per minute that functions without undue vibrations that would otherwise throw the system out of alignment or cause cracks in diaphragms and valves. The long reach 360° rotating boom and arm, and the proprietary “stinger” (spray gun and lance with wand for hydro blasting) are novel to the industry.

The invention features a unique, hydraulically-controlled “stinger” (on-point robotically controlled nozzle spray gun and lance with wand). The power and hydraulic lines run along (and are braced to) the full length of the boom of the robotic multi-jointed arm for superior stability and maneuverability. The invention is unique in its superior maneuverability at such high GPM and pressure, previously unimaginable without the invention’s unique engineering and design. A Radio Frequency controlled system accurately moves the hydraulically powered stinger to the debris site at the proper water-spray angle (not just along a one-vector track like a clumsy power washer).

In many aspects, the blaster features a 1" high pressure feed hose, two hydro-hoses, a power cable, a proprietary control panel optionally mounted on the boom, an RF controller, two-way hydraulic solenoids, and a remote-control unit for the hydraulic-controls for the boom feature, in some embodiments, a handheld pendant-style joystick (4 functions). Older boom controls were primarily manually operated levers. The RF stinger assembly controller offers the stinger full 360° movement in all directions and all angles. The result is that the stinger (water gun & nozzle) is capable of 360° pitch, roll and yaw, bringing the pressure water to any precise location.

BRIEF DESCRIPTION OF THE DRAWINGS

FIG. 15 further illustrates the tower connected to the second slew drive connected to the turret, consistent with various embodiments.

FIG. 16 therefore illustrates a 1" rod mount (a bracket mount) 1603 on the hydro-blasting arm, and the arm's base 1605, consistent with various embodiments.

OPERATIONAL DESCRIPTION OF THE INVENTION

The herein-disclosed invention involves on-point hydro-blasting. The invention comprises a long-reach 360° rotating robotically-controlled boom and multi-jointed arm for hydro blasting. The invention further features a unique remote RF-controlled hydraulic "stinger" (water jet wand gun and nozzle) assembly. The stinger is, inter alia, a pinpoint RF-controlled robotically-maneuvered high pressure water gun & nozzle (spray gun).

Figure 1:
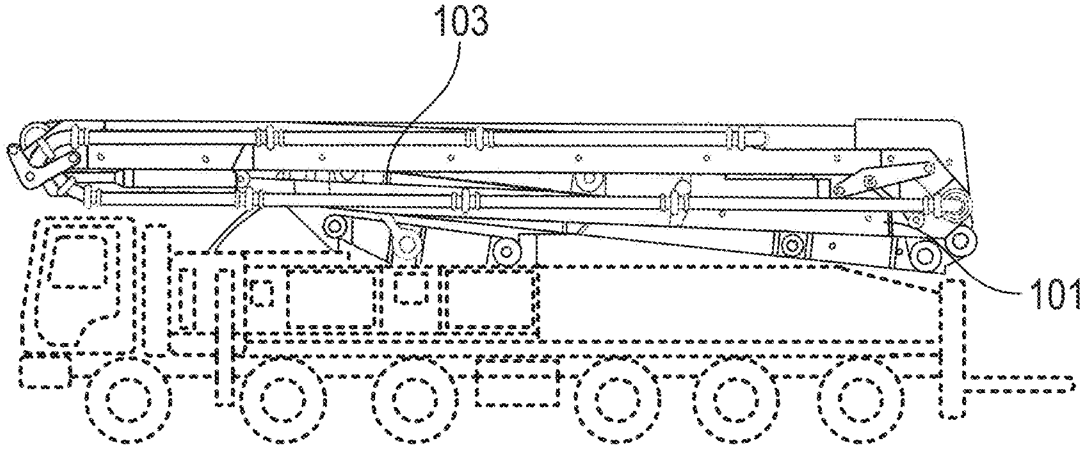
FIG. 1 depicts the robotically-controlled boom consistent with various embodiments (mounted on a base, herein a truck, truck not novel on its own, not a necessary element of the invention).

The engineering & design of the stinger (water spray gun and lance 411 with wand) allows superior stability and maneuverability at extremely high GPM and PSI pressure, previously unimaginable without the invention's unique engineering and design, especially given the system's 170' reach (able to hydro-blast clean the inside of a 170' high tank from all angles while the operator, in one embodiment, sits in the truck shown in FIG. 1).

The invention features, inter alia, an industrial, long reach high pressure water blaster capable of 15,000 PSI, water pressure and 140 gallons per minute. The power and hydraulic lines are positioned along (and bracketed to) the length of the boom (and to the extending robotic arm) for superior stability.

Figure 8:
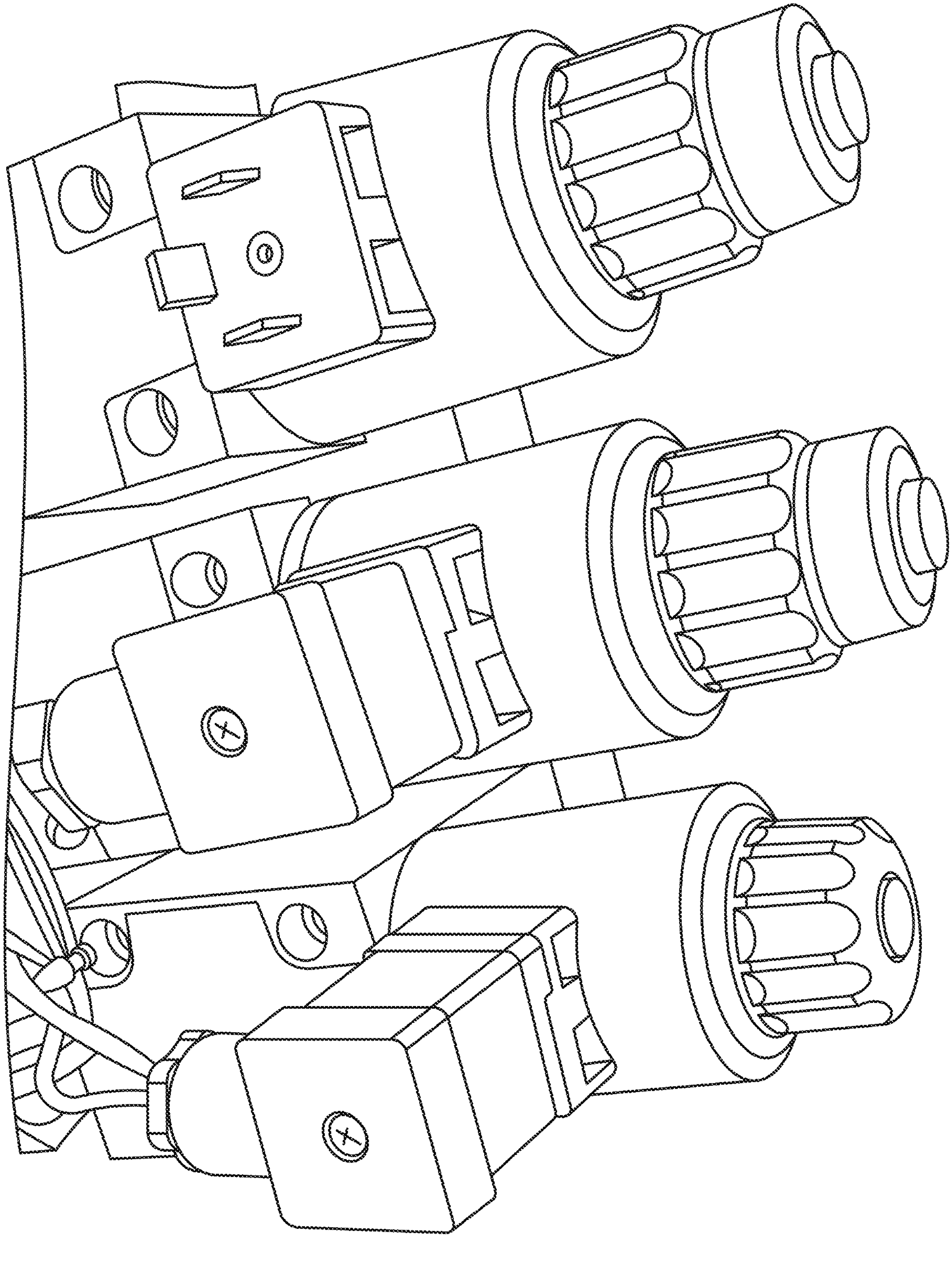
FIG. 8 shows the inside (hydraulic power unit HP) of the control panel for the stinger’s stinger assembly, capable of moving its robotic arm (driven by the stinger’s hydroelectric solenoids), turret and pivot, the unit comprising four solenoids (electro-hydraulic valves that control fluid flow) consistent with various embodiments (in FIG. 8, only three of the four solenoids are shown).

The blaster features a 1" high pressure feed hose 1703 (pumped in through 1" inlet positioned at the base/truck in some embodiments), at least two hydraulic hoses, at least one power cable, a proprietary RF control panel 903 (panel optionally mounted on the boom, a controller, and at least four two-way hydraulic solenoids (as shown in FIG. 8) for stinger 360° control).

Controls for the boom feature, in some embodiments, are through a handheld pendant-style joystick 1901 (4 primary functions of CNC wire-control). Older units may use manually operated levers. Optionally, RF controlled unit(s) may be used, or Bluetooth.

The radio transmitter of the system may be controlled by push buttons, joystick 1901 or linear levers, or other appropriately safe mechanism.

Also featured are slew drive hydraulics, which are high pressure inside ("inside" is the hydraulic power unit HP—the inside box for a hydraulic robotic assembly is also herein referred to as a hydraulic power unit (HP), or the control box). This box houses the "inside" components that manage the fluid flow and pressure, which are essential for powering the robotic arm's movements) inside 903 the stinger mechanism (positioned at the base/proximal end of the stinger/wand) to allow 360° movement. One drive is for 360° X-direction rotation and one drive for is for 360° Y-direction up/down movement, and both drives have their own motor.

The RF controller offers control of 360° movement in all directions and all angles for the stinger (the water gun wand and nozzle). One slew drive offers 360° movement in the Y (forward/backward) direction, and the other [second] slew drive offers 360° movement in the X (around/sideways) direction, therein offering full 360° pinpoint hydro-jet (stinger) positioning.

The result is that the system's stinger is capable of 360° pitch, roll and yaw movement to bring the high-pressure water to virtually any location at the right blasting angle, and reachable at distances-heights 170' (one hundred seventy feet) from the blast-operator, who can control the hydro-blasting robotically in 360° from his truck-seat via robotic/hydraulic boom and "stinger" hydro-blasting rotating-turret arm and nozzle.

DETAILED DESCRIPTION OF ILLUSTRATIVE EMBODIMENTS

FIG. 1 depicts the stingray system mounted on a truck. The form of the system's base is substantially incidental so long as it provides sufficient stability and maneuverability, and is capable of housing the primary components of the stingray system).

In this embodiment, the stingray system is mounted atop the truck in its collapsed (non-deployed/stayed/resting) position. Along the length of the 170' boom 101 are positioned: a 1" high pressure feed hose 103, two hydraulic valves and hydraulic hoses attached thereto, and one power cable(s). (distant features shown in future drawings).

Figure 2:
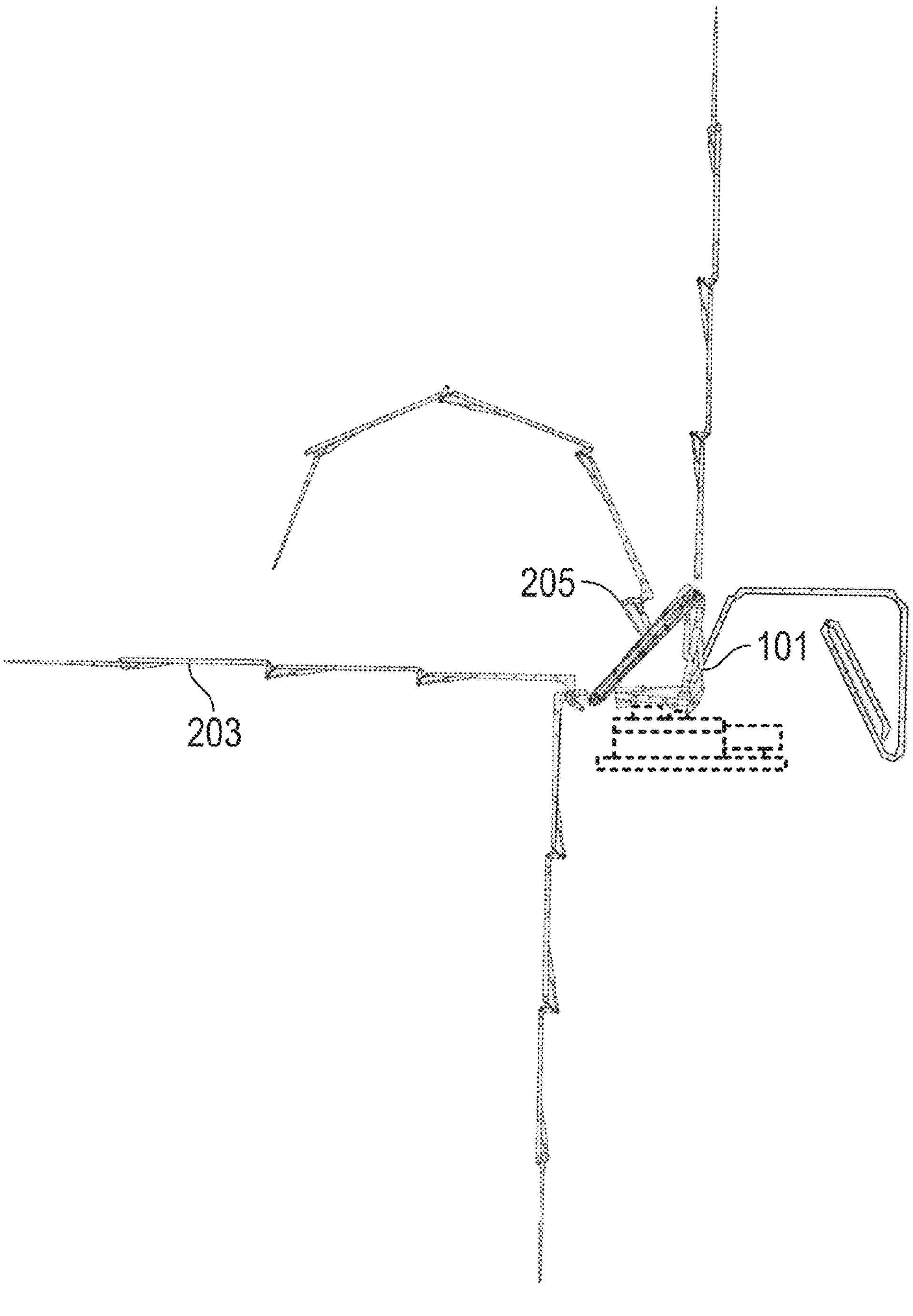
FIG. 2 depicts the robotically-controlled boom and articulated arm and stinger assembly, consistent with various embodiments.

FIG. 2 illustrates the range and directional capacity of the system's robotic arm 205, allowing the stinger 203 to reach a debris site even if the debris is located inside (hydraulic power unit HP) (e.g.) a mining tank positioned 170' above the truck/system-base. The figure depicts the system's maximum 170' height when deployed via boom 101. In other embodiments, the length can range from about 35 meters to about 100 meters, depending on the pumper truck/base used.

Figure 3:
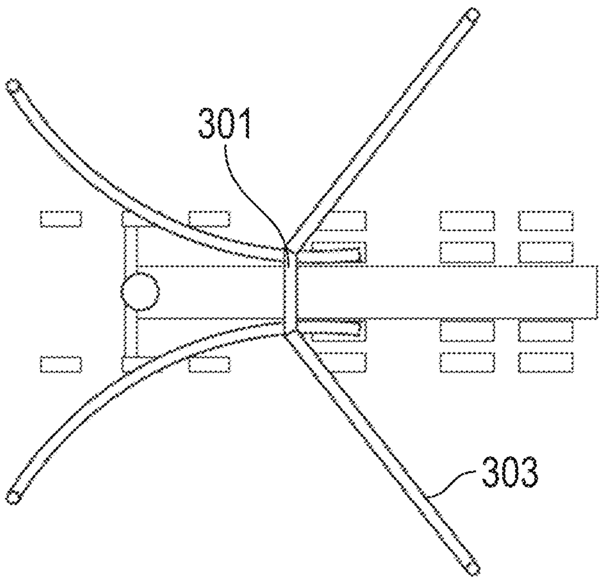
FIG. 3 illustrates exemplar boom and arm range directions from a top aerial view consistent with various embodiments.

FIG. 3 illustrates, via aerial view, the wingspan-range and directional capacity of the system's robotic arm 303, allowing the stinger to reach even concealed debris sites, such as scale located on the inside (hydraulic power unit HP) circumference of a tank.

At 15,000 PSI, the 170' the substantially-steel boom 301 functions as an anchor against vibration. The hydraulic and power lines run internally through boom 301, counteracting the extreme vibration/shake caused by the high-water pressure Furthermore, the substantially square metallic mounts (shown in FIG. 6) along the arm further dampen vibration (in one embodiment, these brackets and mounts are spaced 4' apart). These brace-mounts are combined with metal couplers to reduce excessive vibration of the (high pressure-rated) rubber water hose. Alternatives to welded/bolted brackets are possible; the square pipe bracket materials & shapes may vary so long as the hose-attachment devices appropriately secure the hoses, ensure liquid flow and dampen vibration for the full 180' (max) boom length.

Figure 4:
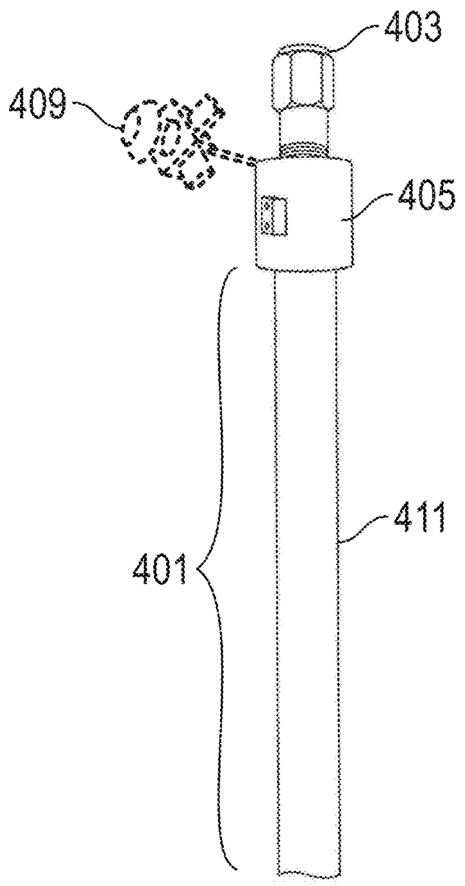
FIG. 4 depicts the. depicts the distal end of the stinger assembly 401, comprising spray nozzle 403, optional camera 409, a ¾" to 1" coupler 405, a 1" rod 411. Together these form the bulk of the stinger spray assembly 401 mechanism (comprising inter alia the shaft-lance 411, the tip and the nozzle 403), with optional directional/monitoring camera 409, consistent with various embodiments.

FIG. 4 illustrates the end/tip/nozzle 403 of the stinger 401 shaft 411 and the stinger nozzle 403. The bulbous cylinder 405 near the proximal end of the nozzle 403 is the swivel 405, between about ¾" to about 1" swivel 405. The Figure also shows the optional camera 409 for the stinger 401 operator.

In one embodiment not shown, the stinger movement mechanism is comprised of a 1" high pressure quick-connect piece, connected to a 1" 900 degree bend/swivel 405 piece 405, connected to a 1" pressure swivel piece, connected to another 1" 90°-degree bend piece, connected to another 1" swivel piece (aka 90° swivel to the hammer lock to the 6" nipple), connected to another 1"-quick connect piece, connected to a 6" nipple, connected to another 1" 90°-degree bend piece connected to an 8" rigid lance/pipe 411. The tip is a 1" to ¾" nozzle swivel, wherein the nozzle 403 is a ¾" diameter aperture with a #90™ jet 403.

Figure 5:
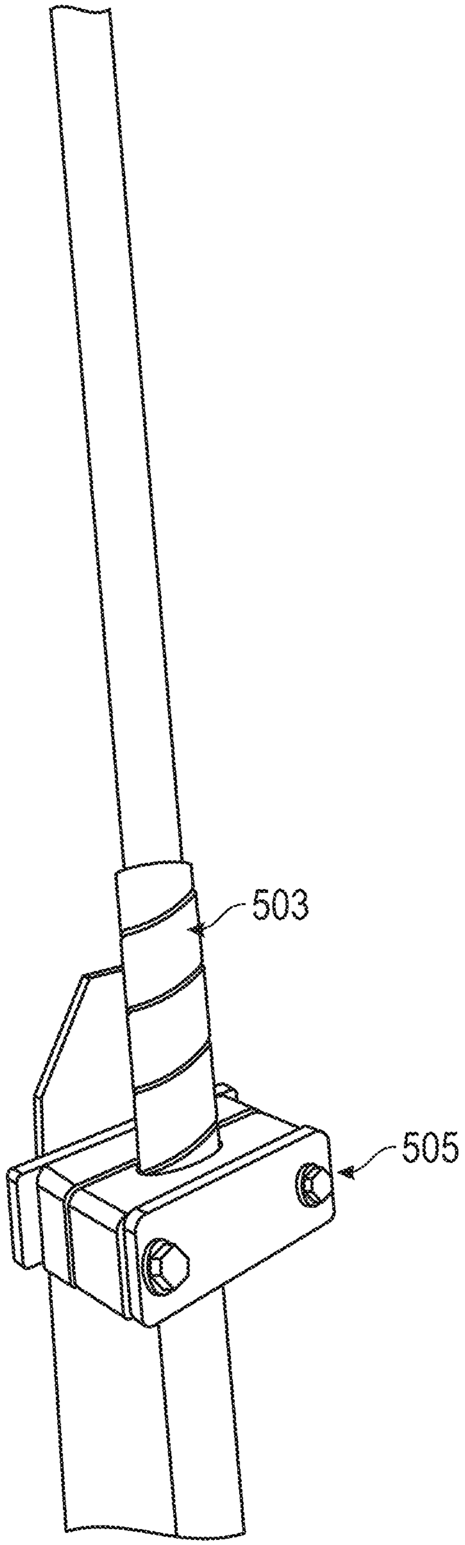
FIG. 5 depicts the position on the stinger (hydro-blaster) arm wherein the base leads to the stinger spray nozzle area (nozzle not shown), this shown-portion comprising the position where the arm transitions to the thinner spray rod/lance, this position comprising a swivel 505 piece and an insulation sleeve 503.

FIG. 5 depicts the stinger shaft. The figure further illustrates the mechanism assembly that moves the stinger, showing a 360° swivel 505 piece near the base (proximal end) of the stinger shaft. This rotating portion of the arm, when deployed near a debris site such as the inside of a 170' tank, the robotic arm positions the stinger near-and-facing the debris location at the desired angle. Near the swivel 505 pivot point, the lance is protected by an insulation sleeve 503. Around the external circumference of the water line (or solvent line) is an isolation sleeve 503 that goes over/around the hose, which is customarily made of plastic/plastic composite. Providing a buffer between metal mounts and the hose helps reduce vibration from the fast-flowing, high-pressure water.

The (unseen) control unit provides stinger rotation to direct the water at any angle (even if the debris is unseen, such as the internal surfaces of a tank). High pressure swivel pieces are positioned inside (hydraulic power unit HP) the stinger, one for 360° sideways rotation, and one for 360° front/back movement.

The control panel and unit is for the system's multi-jointed robotic arm. This unit comprises four solenoids, a two-way radio controller, a transmitter & receiver. In some embodiments, the remote unit comprises an HBC radio remote control transmitter unit.

Figure 6:
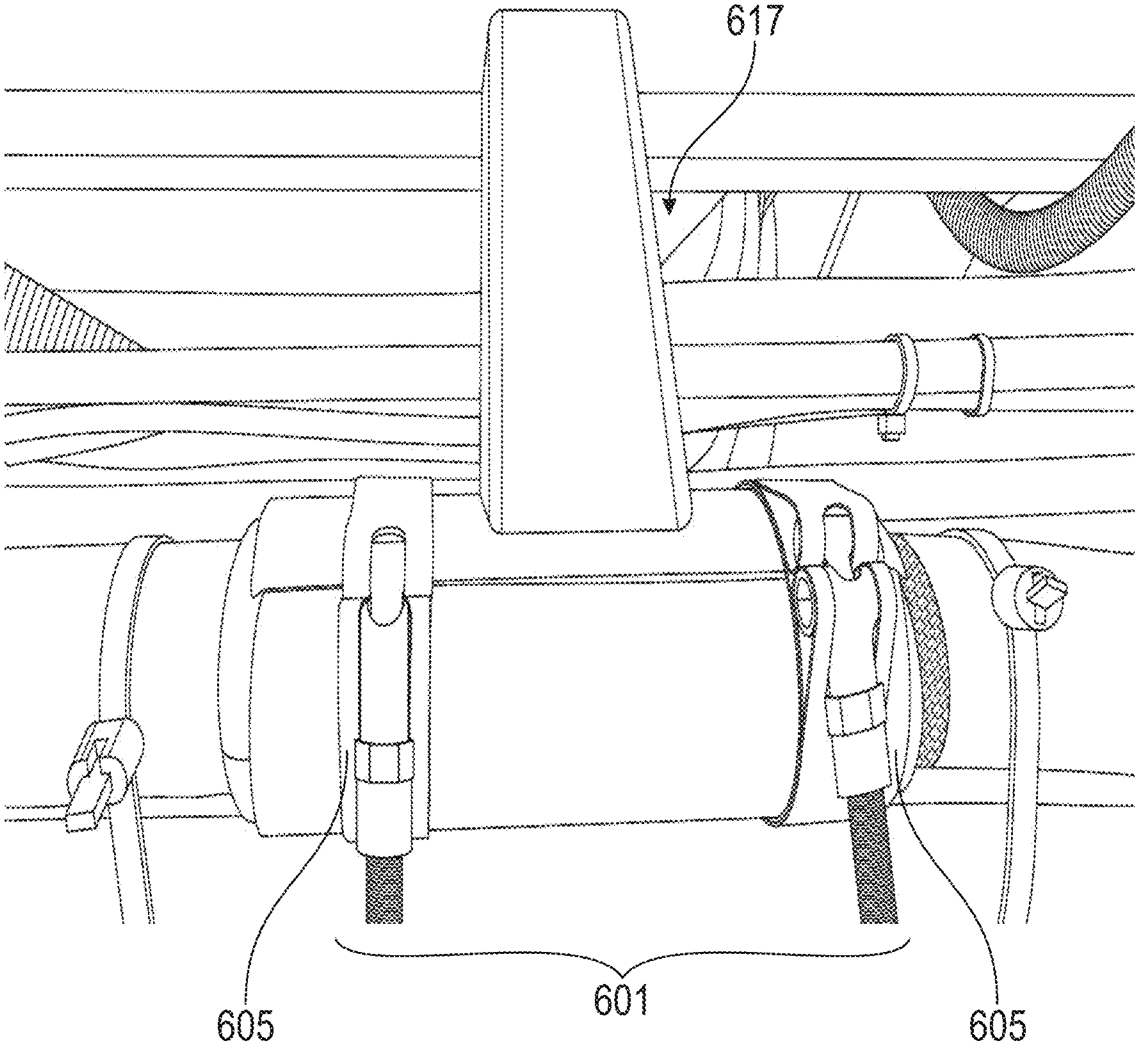
FIG. 6 depicts the clamps 605 and a mount-bracket 601 along the boom, holding hydraulic and powerlines to the boom, stabilizing the system, consistent with various embodiments; also showing a 1.5" square tube 617 welded to boom (Note: 5' spacing of these weld-fixtures are typical along the boom in the preferred embodiment).

FIG. 6 depicts a zoomed version of one side view of the invention's arm, showing the 1.5" square tube/hose 617 welded to the boom, two 2" clamps 605 (two per bracket as shown) and a 1" supply hose mounting bracket 605 and metal couplers holding power, water and hydraulic lines fixed to the boom in order to stabilize the system (consistent with various embodiments). The mounts are substantially comprised of metal, substantially square tubing pieces which are welded to the boom. Other similarly stable attachment mechanisms are allowable.

The brackets 605 are, in the preferred embodiment, spaced four feet apart along the boom and robotic arm. Other distance ratios are allowable so long as stability and durability are maintained.

Figure 7:
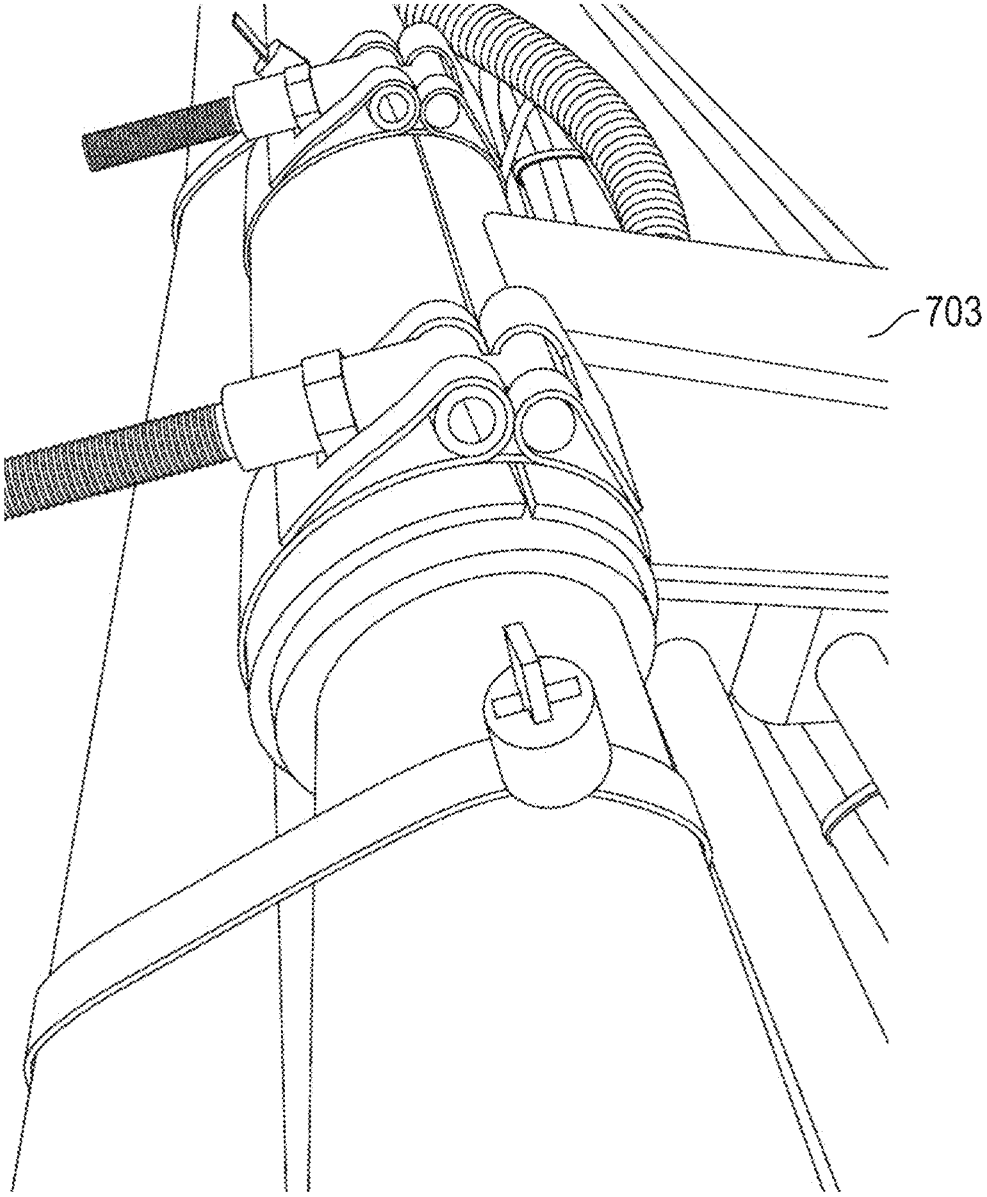
FIG. 7 depicts the bracket mounts [for braces/hose-swivel] and mounts 703, individually installed approximately 4' (four feet) apart along the boom (for, e.g., a 170' (one hundred seventy foot) boom in the preferred embodiment).

FIG. 7 depicts the brackets 703 and metal couplers' holding power via positioning. The boom bracket mounts 703 are welded to the boom at substantially regular intervals. Water, power and at least one hydraulic line are affixed to the boom in order to stabilize the system (consistent with various embodiments). In the preferred embodiment, the mounts 703 are substantially comprised of metal, substantially square tube brackets welded to the boom. Other similarly stable attachment mechanisms are allowable.

FIG. 8 shows 12-volt electric over hydraulic solenoids. These are used to manipulate the stinger (the 360° hydro blasting robotic arm+nozzle). Here in FIG. 8, three such solenoids are shown (out of four solenoids in the preferred embodiment). Important but not shown, the inside (hydraulic power unit HP) of the control panel (the RF control panel for the stinger's robotic arm comprising four solenoids (which are, inter alia electro-hydraulic valves that control fluid flow). *Note that, in this disclosure, a solenoid, electrohydraulic valve, hydraulic flow control and electro-hydraulic valve(s) and hydraulic cylinder(s) are often used synonymously throughout this disclosure. Only 3 out of the 4 solenoid/solenoids are shown this embodiment/figure, FIG. 8.

Figure 9:
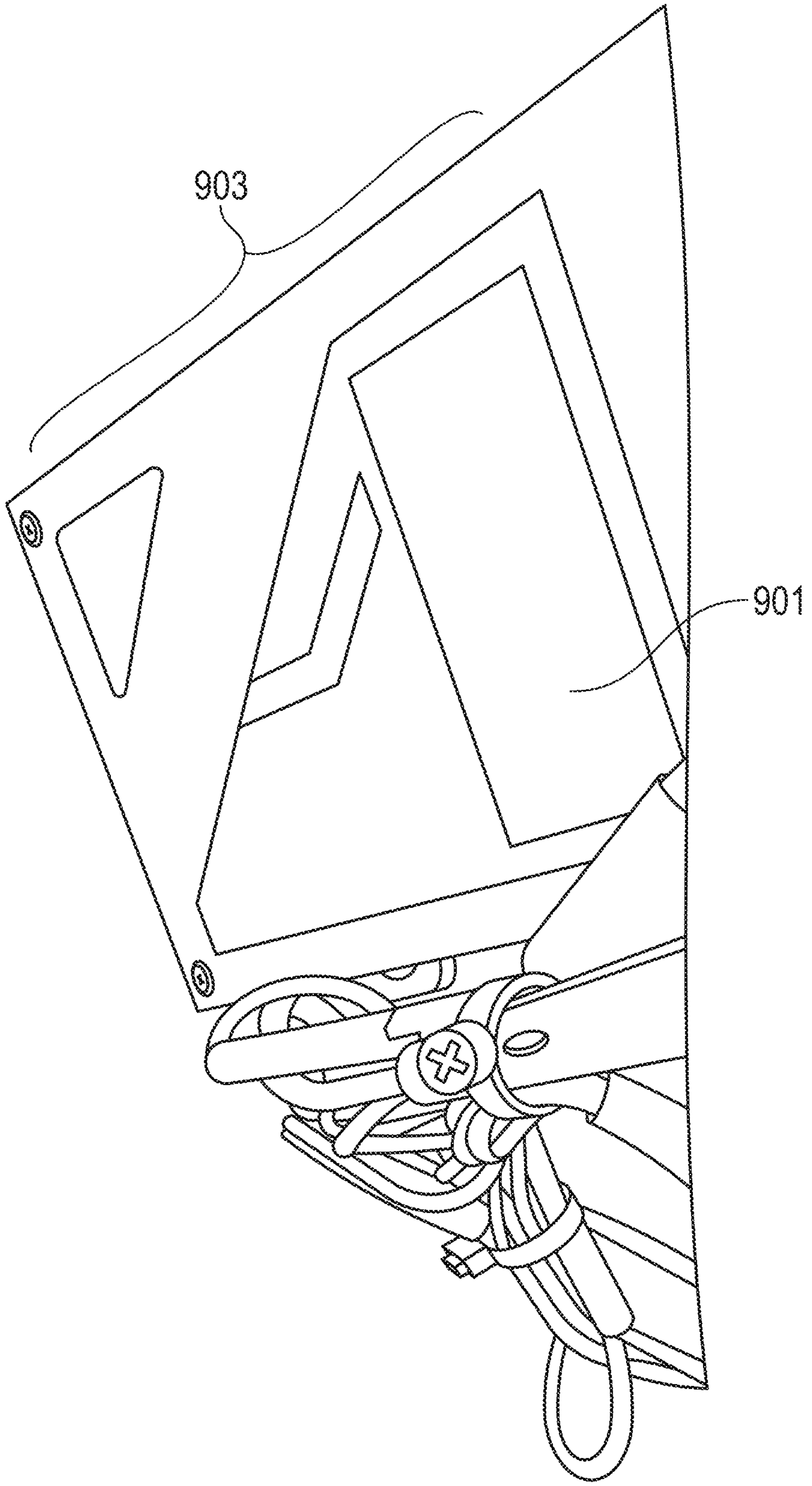
FIG. 9 shows the controller panel 903 comprising control receiver 901, in some embodiments.

FIG. 9 shows the radio controller panel 903, comprising at least a transmitter and a remote signal receiver 901 for the stinger's operation. In some embodiments, the controller is a proprietary RF control panel 903 and unit optionally mounted on the boom. The stinger's remote-control system is wireless, using an RF frequency to communicate between the control box, the control panel 903 (optionally positioned on the boom) and the hydraulic cylinder. In some embodiments, the remote unit is an HBC radio remote control transmitter unit.

Figure 10:
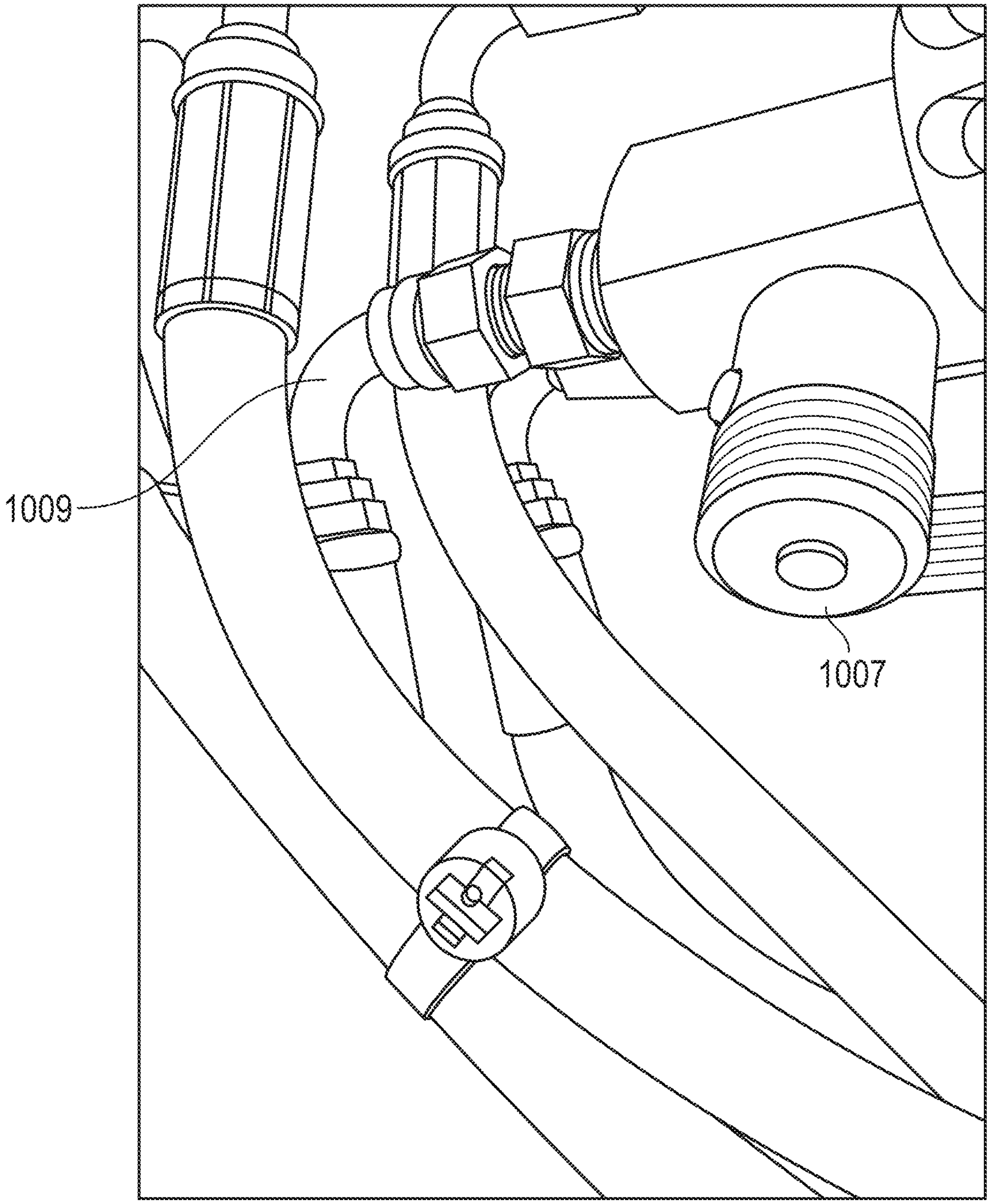
FIG. 10 depicts the four hydraulic lines/hoses 1009 coming out of the control panel (panel not shown), running down to the hydraulics (not shown), each line comprising a flow control valve 1007, consistent with various embodiments.

FIG. 10 depicts the four hydraulic lines 1009 coming out of the control panel 903 (not shown), going down to the hydraulic motor (motor not shown in FIG. 10) and reservoir (not shown), each of the lines 1009 controlled by a hydraulic flow control valve 1007. The hydraulic flow control valves 1007 set the speed of travel for the hydraulic motor (not shown) on the stinger (not shown). These components are positioned inside the control panel (not shown) of the stinger assembly. FIG. 10 therefore depicts the four hydraulic lines/hoses 1009 coming out of the control panel 903 (panel not shown), running down to the hydraulics, each line comprising a flow control valve 1007, consistent with various embodiments. Each hydraulic control valve 1007 sets the speed of travel for hydraulic motor 1103 [next Figure] on the stinger (the hydro-blaster), positioned inside the control panel of the stinger assembly (the panel of FIG. 9).

In a preferred embodiment, Maximum Oil Flow is 158.5 gal/min [600 1/min], and Hydraulic Circuitry Type is MPS (machine protection system) 1815™, providing smooth linear motion to the hydraulic actuator(s).

Figure 11:
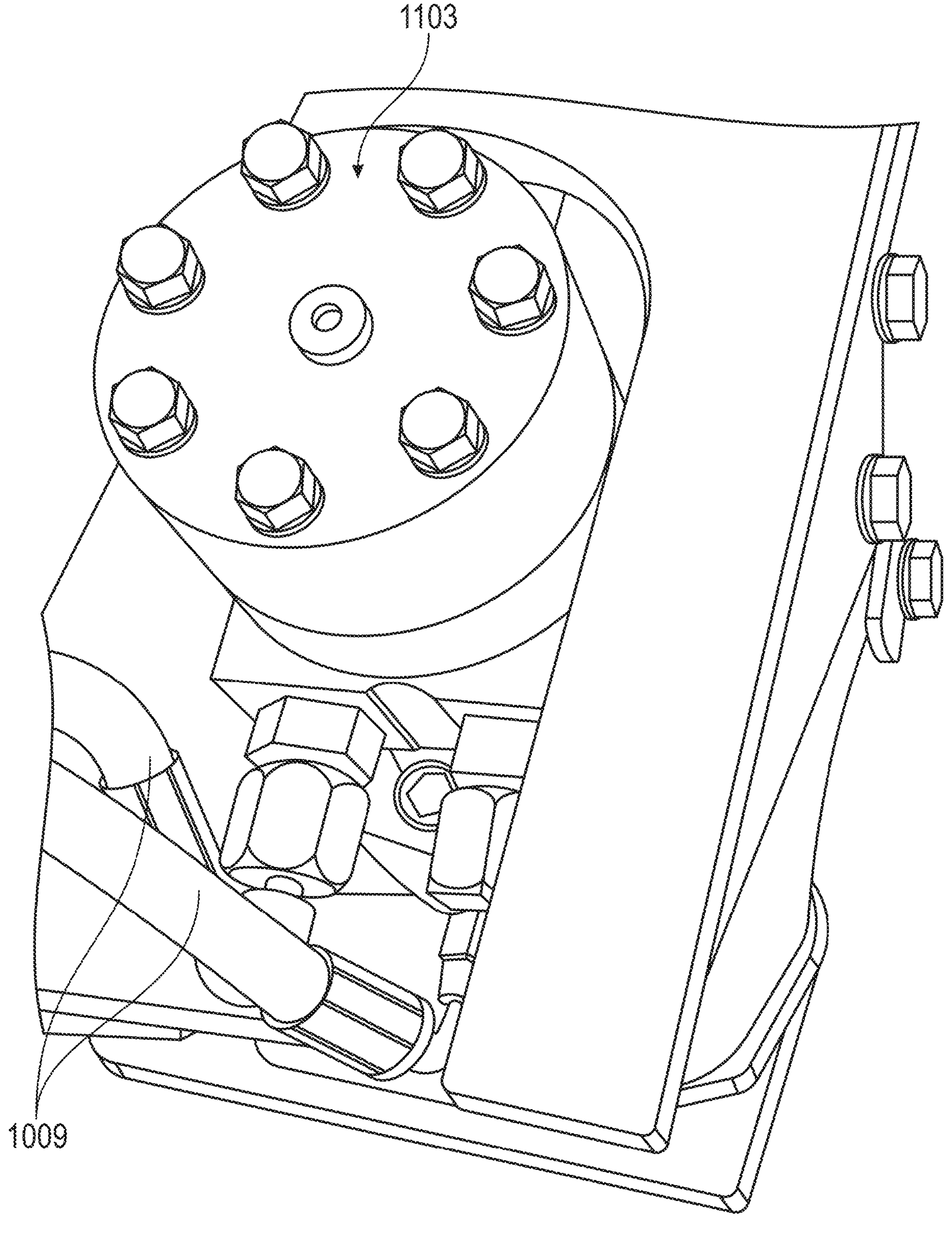
FIG. 11 depicts one side of the stinger assembly 405 tower, illustrating a slew drive and the necessary hydraulic movement mechanism to rotate the turret and swivel, and pivot of the stinger.

FIG. 11 depicts the stinger (robotically-controlled hydro-blaster's) hydraulic motor 1103, used to rotate, raise and lower the stinger. At the bottom of FIG. 11 are positioned two hydraulic lines 1009 which go to the hydraulic motor. Shown are the motor drives, two hydraulic lines and at least one slew drive motor (motor and turret shown here).

Figure 12:
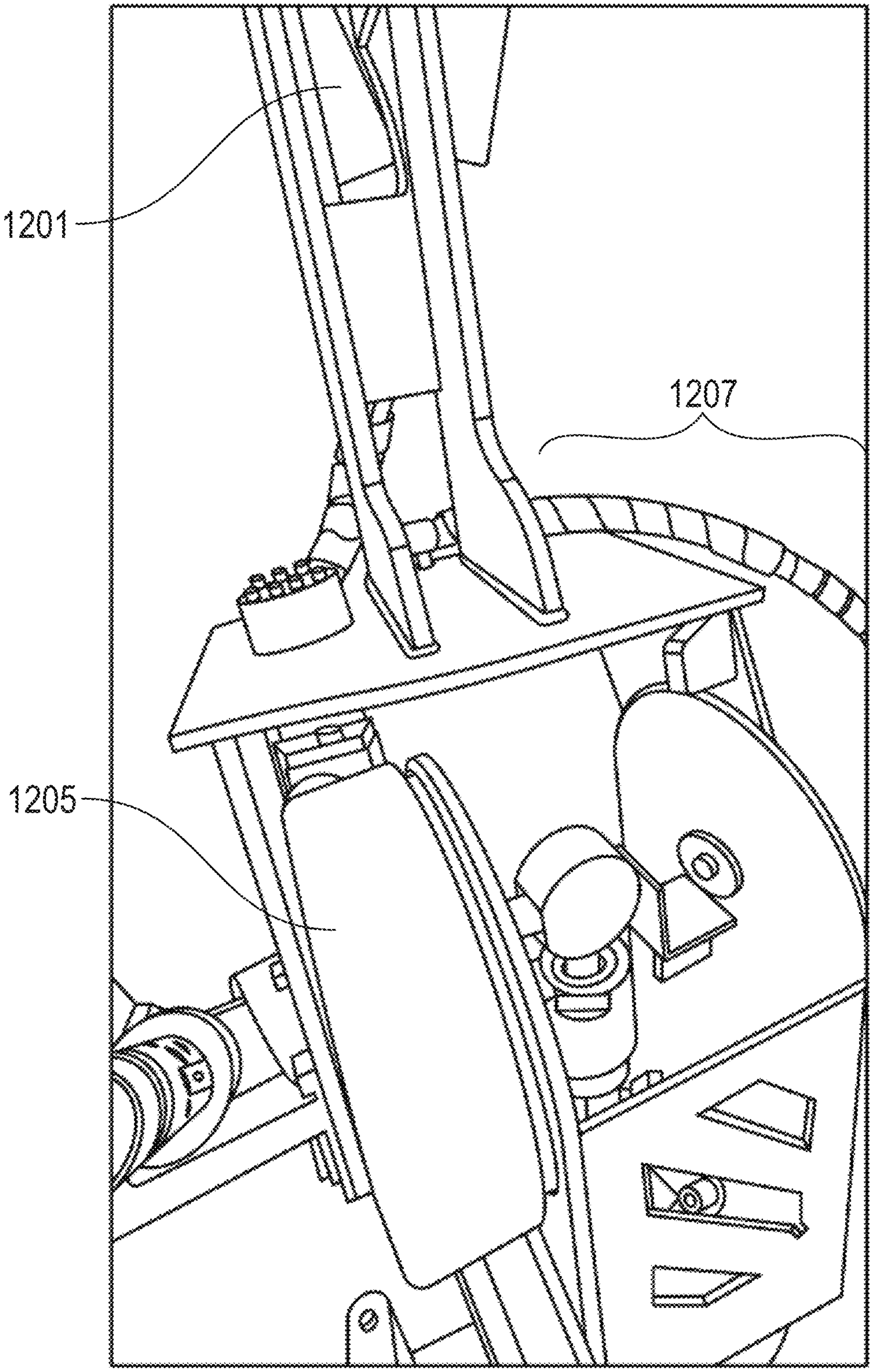
FIG. 12 depicts a portion of the stinger (hydro blaster’s) assembly hydraulic arm, comprising a boom and a dedicated raise/lower hydraulic motor.

FIG. 12 depicts the upper stinger assembly 1207, a portion of the stinger (hydro-blaster's) assembly: comprising, inter alia, the boom 1201, the hydraulic motor 1205 (raises/lowers the stinger arm). FIG. 12 therefore depicts a key portion of the invention's multi-directional robotic arm. FIG. 12 also features a separate motor 1205, a dedicated raise/lower (up/down) hydraulic motor 1205, controlled by the "inside (hydraulic power unit, or "hydraulic power" "HP")" 903 (not shown)).

Figure 13:
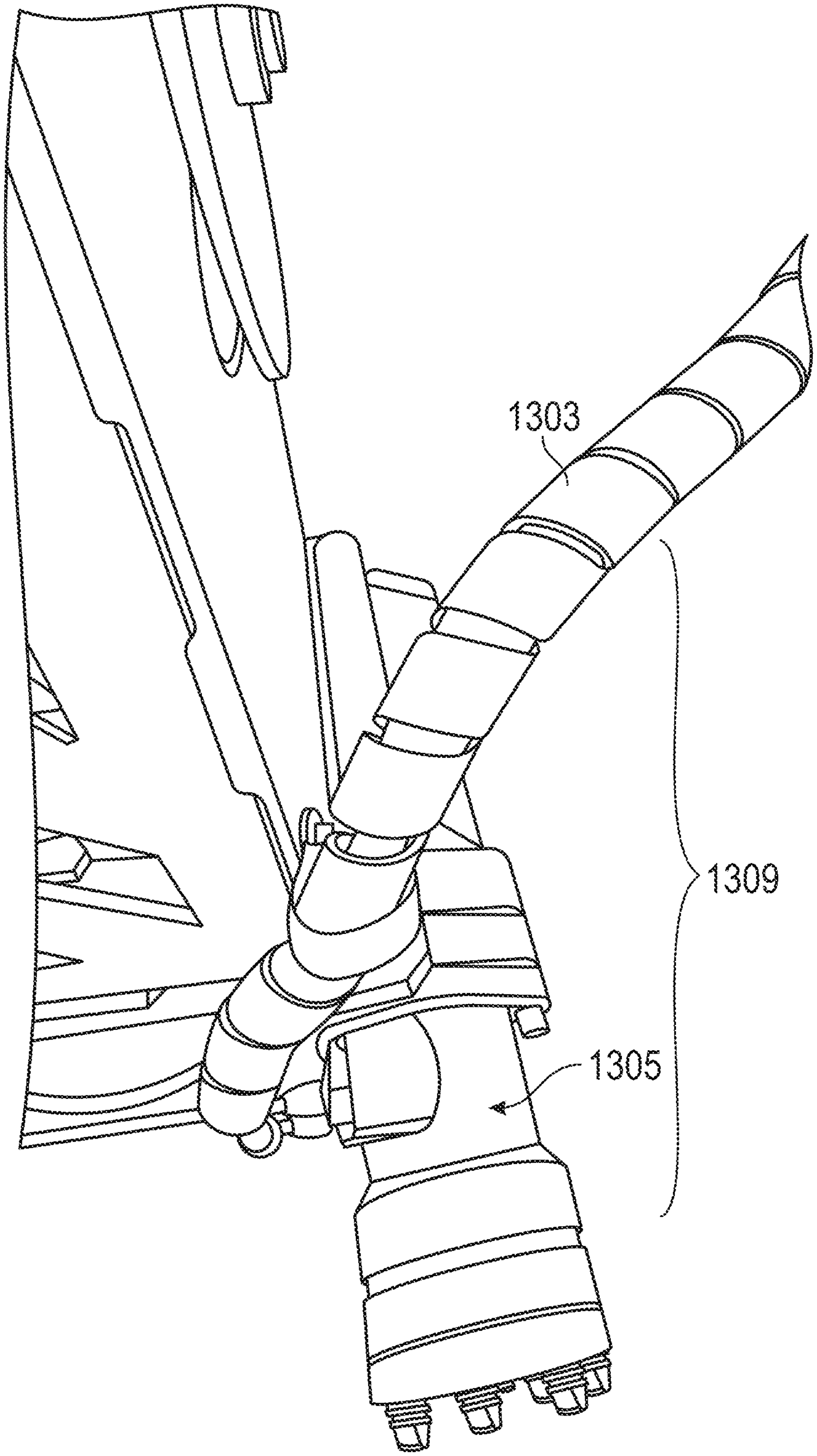
FIG. 13 depicts a second slew drive 1309, here the slew drive rotates the turret that holds and rotates the stinger assembly, consistent with various embodiments. Shown are shielded hydraulic hoses 1303 and rotation hydraulic motor 1305.

FIG. 13 depicts a second slew drive 1309 (the slew drive connects and operates the motor and turret, consistent with various embodiments). The shielded hydraulic hoses 1303 feed the rotation hydraulic motor 1305, which moves the stinger side to side via its turret.

Figure 14:
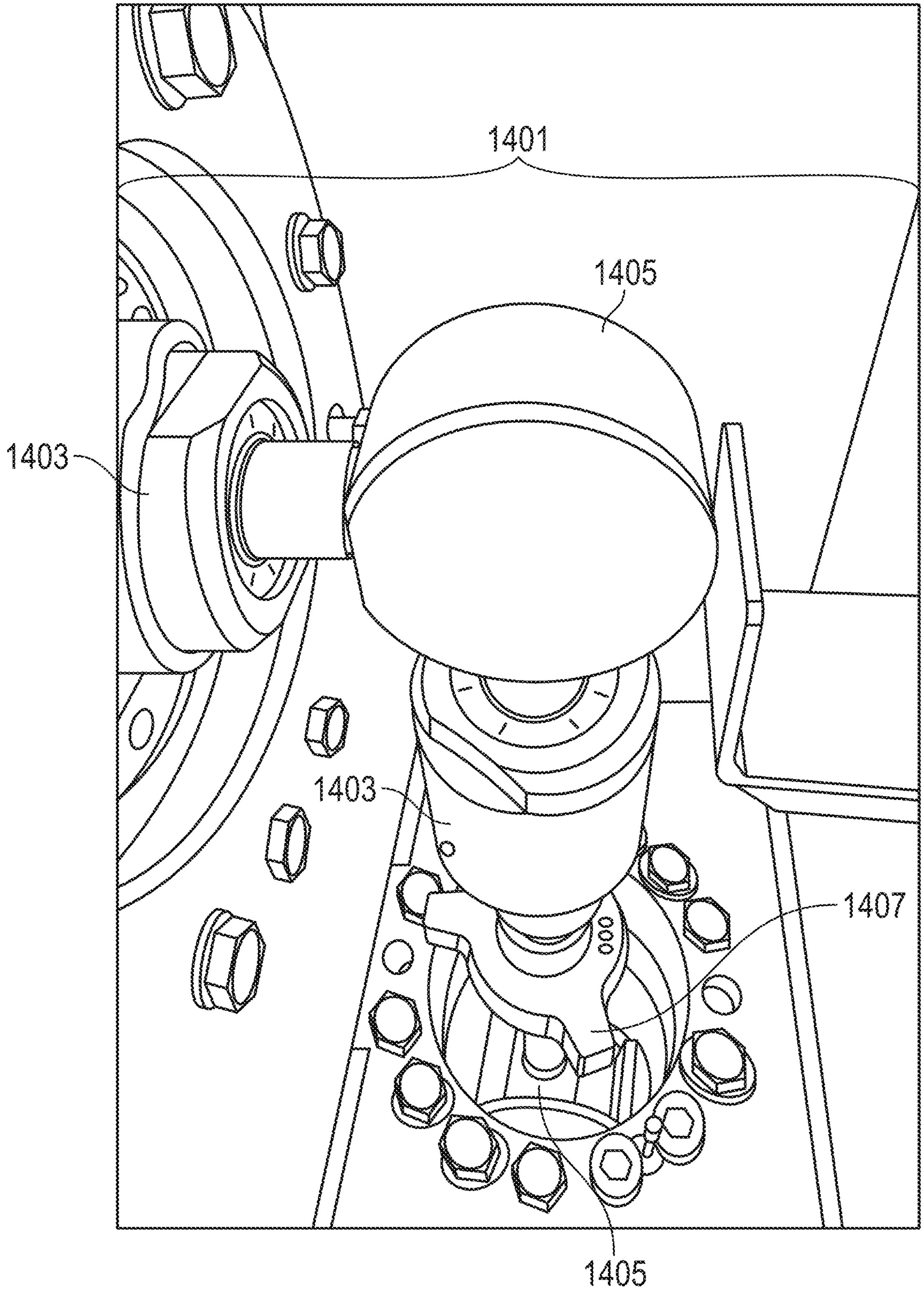
FIG. 14 depicts the one-inch-high [first] swivel 1403 piece, the 900 piece 1405, and the second swivel 1403 piece, consistent with various embodiments.

FIG. 14 depicts the high-pressure water plumbing subsystem 1401 of the “stinger” (the tailored robotic 360° hydro-blaster). This system 1401 comprises two one-inch-high pressure swivels 1403 (inside the hydraulic power unit HP) 903 (not shown) of the tower (not shown), consistent with various embodiments. The system 1401 further comprises two 90° bend pieces 1405, and a 1" coupler 1407.

Figure 15:
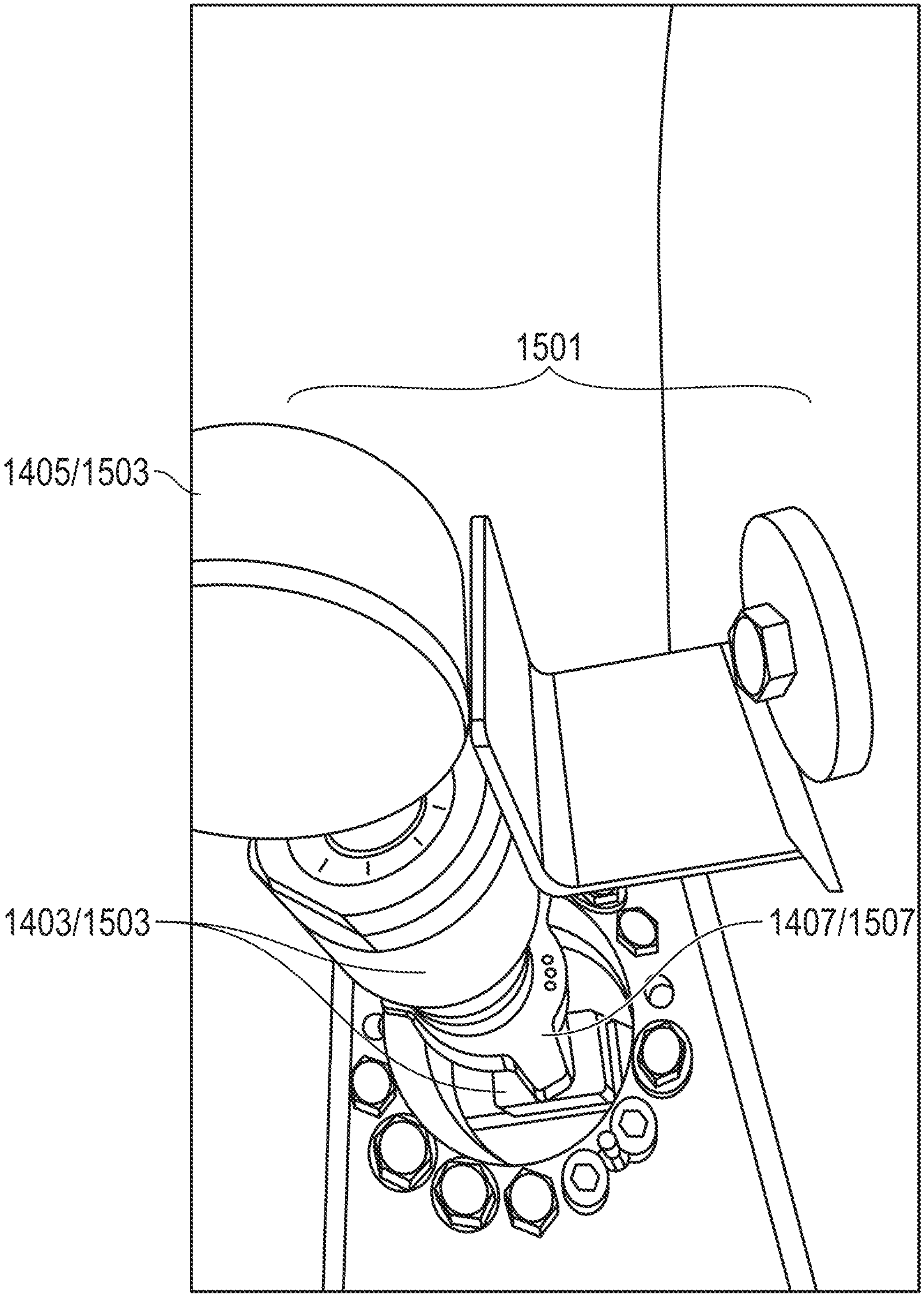
FIG. 15 illustrates the arm mechanism's 90° swivel 1505 to the hammer lock to a 6" nipple to another 90° bend-piece 1503, consistent with various embodiments.

FIG. 15 illustrates the high-pressure water plumbing subsystem 1501, comprising a 1" 90° connecting-bend piece 1405/1503, a 1" coupler 1407/1507 coupling the hammer lock (not shown) to a 6" nipple (not shown) to (two) 1" swivel piece(s) 1403/1503 piece, consistent with various embodiments. The figure shows what's positioned on the inside of the hydraulic power unit HP) (not shown) 903 of the tower (not shown) connected to the second slew drive (not shown), consistent with various embodiments.

Figure 16:
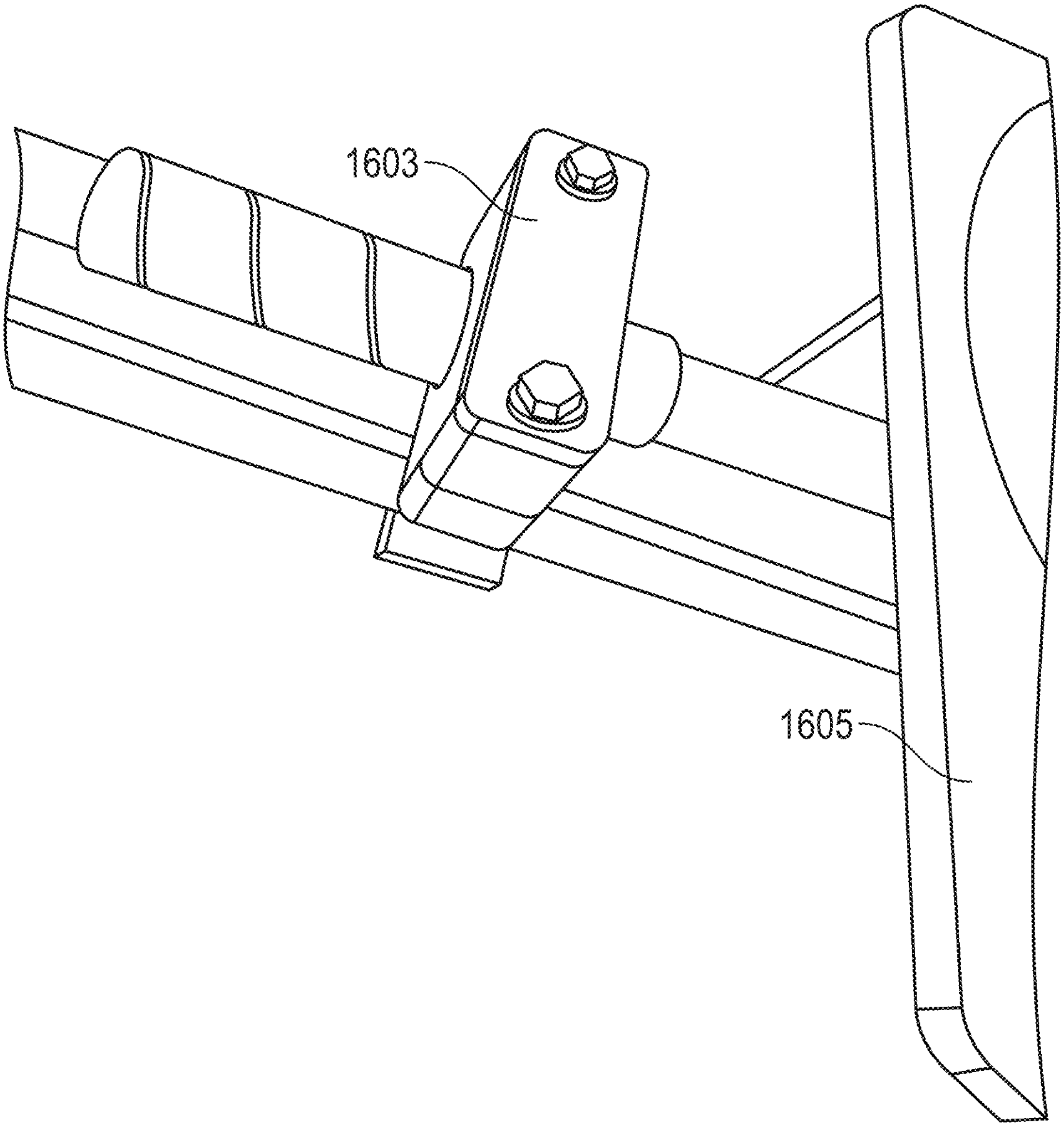
FIG. 16 depicts the end of the stinger assembly's arm leading to the stinger's mount, coming out from the arm toward stinger nozzle, consistent with various embodiments.

FIG. 16 depicts a 1" rod mount (a bracket mount) 1603 on the hydro-blasting arm, and the arm's base 1605, consistent with various embodiments.

Figure 17:
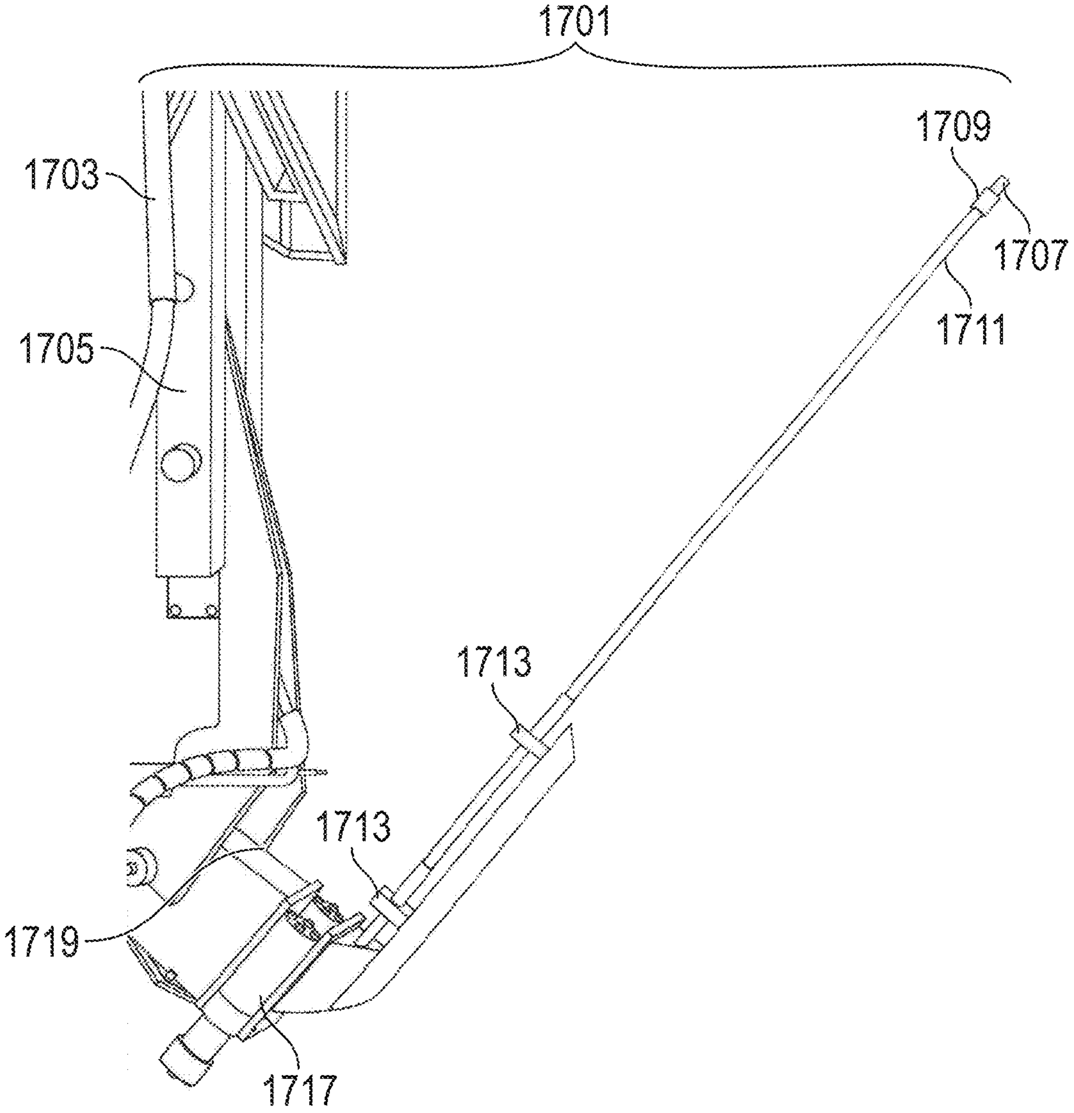
FIG. 17 illustrates the stinger assembly, its tower leading to its hydraulic arm, here shown pivoting the stinger up/down with full 360° motion along this Y-Axis as shown, allowing the stinger (the tip shown at the right of the drawing) to angle itself in any direction along this axis, illustrating how the stinger gun is positioned at a precision blasting debris point and desired angle, consistent with various embodiments.

FIG. 17 illustrates the hydraulic arm rotating the stinger 360° up/down, illustrating how the stinger gun is positioned at a precision blasting point. The figure highlights the stinger connected to the turret connected to the slew drive connected to the tower connected to the boom mount.

FIG. 17 shows the system's hydro-blasting arm and nozzle and its rotation mechanism from the ‘non-operational’ “passenger” side of the assembly 1701. Described from left to right, the Figure features the assembly's 1" water supply hose 1703, the boom 1705, the lift and lower hydraulic motor 1103/1719, the hydraulic rotation motor 1717, the rotating turret 1715, two 1" rod-mounting brackets 1713, the 1" diameter rod 1711, a 1×¾" coupler 1709, and the 1" spray nozzle 1707.

In one embodiment, as shown in FIG. 17, the stinger (hydro-blaster) movement mechanism that moves the hydro-blasting arm (the system's 1"×8" rigid lance-pipe/rod 411/1711).

The tip comprises a 1"×¾" coupler 1709, wherein the nozzle 403/1707 is, in the preferred embodiment, a Tungsten Carbide style linear material comprising a ¾" diameter aperture with a #90™ jet 403 (in the preferred embodiment).

Figure 18:
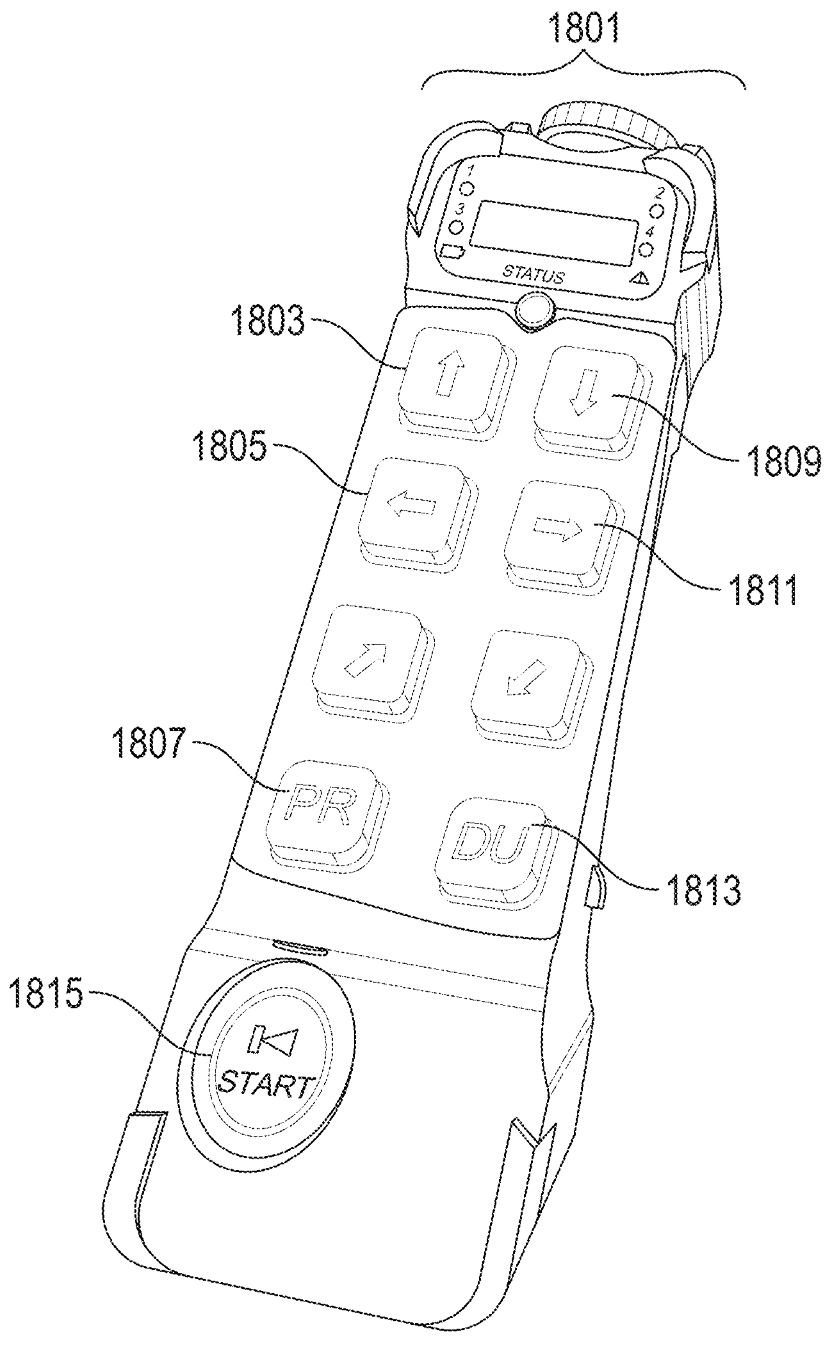
FIG. 18 illustrates the RF stinger hydraulics movement flow and fluids controller, consistent with various embodiments.

FIG. 18 illustrates the RF stinger controller 1801, consistent with various embodiments. Six buttons control the stinger's (360° hydro-blaster's robotic movement), while two buttons control water flow. In some embodiments, the remote unit is an HBC radio remote control transmitter 903 unit.

In FIG. 18, describing the RF controller 1401's control-buttons counterclockwise from the upper-left of the unit, the button/arrows indicate UP 1803 with “up arrow,” left 1805, “PR” 1807 for water pressure application 1807, Down 1809 as “arrow down,” Right-rotation 1811 with “right arrow,” water pressure dump “DU” 1813, and the (bottom of controller button) ON/OFF/HORN button 1815.

Figure 19:
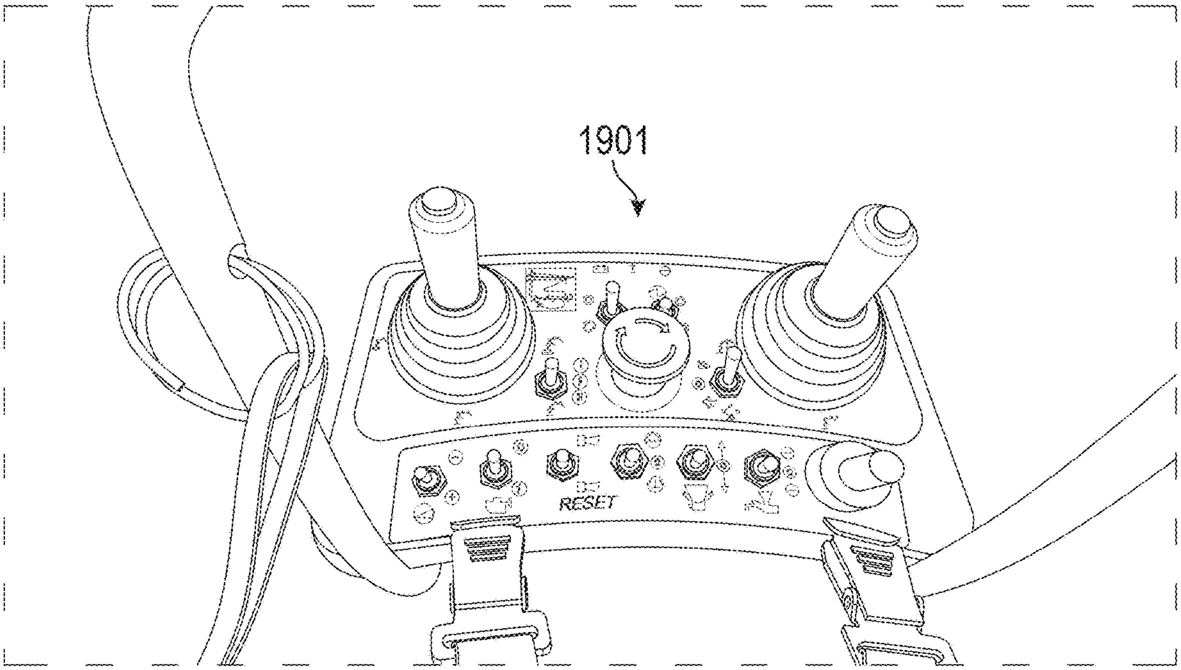
FIG. 19 illustrates the joystick controller 1901 (here a transmitter unit) for boom control, optionally a modular detachable unit, consistent with various embodiments.

FIG. 19 illustrates the system's truck boom remote control. The Truck-model (shown in FIG. 1) joystick-style boom remote controller 1901 (a separate controller from the “stinger” controller) (conversely, the 360° mobile hydro-blasting arm) controller is shown in FIG. 19). The FIG. 19 boom controller 1901 is herein shown in FIG. 19, consistent with various embodiments. Controls for the boom, in some embodiments, a handheld pendant-style joystick 1901 as shown (showing four functions). Furthermore, CNC wire-connected units (or even manually operated levers) or RF controlled unit(s), or other appropriate controls may be used.

ALTERNATIVE EMBODIMENTS

An industrial device for hydro-blasting debris in hard-to-reach places, the device having a base at least one hydraulically powered boom, the boom having a proximal end positioned at the at the base and a distal end positioned vertically above the proximal end, a boom controller, at least four electrohydraulic valves, at least one motor which drives the hydraulics, at least one hydraulic fluid reservoir, a tower assembly at the distal end of the boom which connects to a stinger solvent spray assembly, where the stinger assembly houses at least one solvent line, where the stinger assembly comprises least a first and a second slew drive, where each slew drive is fed by at least two hydraulic fluid lines 1009 and at least one power line;

where said lines run along the boom into the stinger assembly 405 and ultimately to the stinger spray, the lines being securely fixed to the boom by brackets which are fixed to the boom at substantially regular intervals, the intervals being between about P apart and about 6' apart, and where the brackets help dampen vibration at high water pressures up to 15000 lbs. and ensure reliable water flow at these maximum pressures and reduce resultant stress that would otherwise quickly disassemble the mechanism and disrupt solvent flow, and where the stinger assembly is moved by at least two slew drives for 360° motion along both a horizontal plane and a vertical plane, empowering a stinger spray nozzle to point in any direction, and where the boom and stinger together reach debris sites 170' away from the base, wherein the slew drives connect to a rotating turret and a pivot stinger assembly, wherein the stinger assembly comprises at least a lance/shaft, a waterjet trigger mechanism, and a nozzle, and wherein the stinger assembly is controlled by a two-way radio frequency stinger control system, said RF control system comprising at least a transmitter unit and a receiver unit; wherein the receiver unit has at least four hydraulic fluid lines running therefrom, wherein each hydraulic fluid line comprises at least one flow-rate valve.

The base can be a truck of sufficient mass to support the device's remaining components.

The boom can be a multi-jointed articulated arm hinged-fixed to the base, said arm capable of at least vertical motion.

The boom controller can be positioned inside (hydraulic power unit HP) a panel affixed to the boom.

The device can have a joystick-operated controller comprising at least six control features for movement and flow functions, and wherein said joystick-operated controller is an optionally detachable modular remote unit.

The solvent line can be a 1" water line with optional fittings.

The stinger lance is usually a rigid metallic 1" diameter pipe. The stinger lance can have a size between about 3" long and about 12" long with a diameter of between about ½" to about 2". The stinger spray nozzle can be a Tungsten Carbide nozzle with a #90 Jet™ The RF stinger control system can have a manual or auto override safety system.

The device can also be a hydro-blasting device comprising a hydraulicly powered articulated main boom attached to an articulated robotic stinger arm, both apparatus' having a proximal end and a distal end; said blasting device further comprising a hydraulic turret assembly which rotates 360° along one axis, further comprising a rotatable jet-support assembly mounted on the turret assembly, said jet-support assembly having a proximal end and a distal end, said jet-support assembly pivoting 360° along a second axis traversing the first axis perpendicular to the turret's axis, and a hydro-jet wand mounted on the distal end of the support assembly such that the turret assembly and jet-support assembly together give the jet-wand full 360° directional capacity; said boom, assembly and wand components being connectable to a high pressure water source, wherein the blasting device further comprises radio frequency control and drive-means for operating the rotating turret and the pivoting jet-support assembly so as to position the stinger nozzle at any reachable position any available angle.

The rotating turret and pivoting jet-support assembly may each be driven by two dedicated slew drives.

The hydraulics may be controlled by at least four computer-operated solenoids, each solenoid having at least two hydraulic lines stemming therefrom.

The device may further comprise a high-pressure hose running through a central channel in the turret and jet support assemblies, said hose connected to the stinger assembly by coupling devices substantially evenly spaced along the boom, and wherein the hydraulic, power and water lines are secured to the boom by metal pipe-style mounted brackets, therein allowing water flow at up to 15000 lbs. without undue structural or hose vibration.

The device may have at least one hose is sheathed in an isolation sleeve;

The coupling devices comprise mounts and brackets arranged along the boom, where the brackets are substantially metallic pipe-style brackets and ties.

The stinger assembly may have a substantially central channel for at least 1 fluid line, at least one 900 swivel piece to prevent hose-tangling, and at least one hammerlock to allow controlled 360° movement.

The device may further comprise at least one digital video camera and at least one monitor for stinger positioning and system monitoring.

The system may further comprise an override safety system.

The device may be an industrial hydro-blasting device mounted on the far end of a concrete-pouring truck's boom, wherein the device comprises at least a lance/shaft/rod feeding a waterjet trigger mechanism, and a nozzle, wherein the lance, the jet trigger mechanism and the nozzle all have 360° range motion driven by a Radio Frequency controlled hydraulic turret and pivot mechanism.

SPECIFICATIONS GENERALLY

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally. While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements. In the present disclosure, all embodiments where "comprising" is used may have as alternatives "consisting essentially of," or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element. The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims. According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means. Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general-purpose hardware and computer instructions; and so on—any and all of which may be generally referred to herein as a "circuit," "module," or "system." While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

The invention claimed is:

1. A mountable hydra-style hydro-blasting device comprising at least one hydraulicly-powered boom connected to a plurality of at least two articulated robotic independently-moving stinger arms reaching up to 180 feet from the boom, each arm being controlled by a two-way remote RF control system, wherein each independent arm comprises at least four hydraulic fluid lines, each hydraulic fluid line comprising at least one flow-rate valve, wherein the fluid lines are fixed to the independent arms by vibration-dampening brackets and bracket mounts fixed to the arms at substantially regular intervals of between about 1' apart and about 6' apart, wherein at least one fluid line is sheathed in an isolation sleeve, and wherein each arm comprises a shaft leading to a nozzle assembly, the shaft being lance comprised of rigid metallic pipe between about 3" length and 12" length and having a diameter between about ½" and about 2", each lance having independent 360° directional capacity, the lance terminating with an independently-moving nozzle assembly with 360° degree rotational capacity, the lance comprising a waterjet trigger mechanism, the jet mechanism terminating in a tungsten carbide nozzle with a #90 Jet™ sprayer capable of spraying at least one solvent at pressures up to 15000 psi, and wherein each sprayer further comprises a safety override system.

2. The invention of claim 1 further comprising a joystick-operated controller for each arm, the controller comprising at least six control features for movement and flow functions, wherein the joystick-operated controller is an optionally detachable modular remote unit.

3. The invention of claim 1 wherein at least one of the articulated robotic independently-moving stinger arms further comprises at least one digital video camera for stinger positioning and monitoring.

* * * * *